May 7, 1929. H. D. COLMAN 1,712,254
MACHINE FOR GENERATING GEAR WHEELS
Filed March 16, 1923 12 Sheets-Sheet 6

Inventor:
Howard D. Colman
By Churchill Parker Carlson
Att'ys.

May 7, 1929.   H. D. COLMAN   1,712,254
MACHINE FOR GENERATING GEAR WHEELS
Filed March 16, 1923    12 Sheets-Sheet 8

Inventor:
Howard D. Colman

May 7, 1929.  H. D. COLMAN  1,712,254
MACHINE FOR GENERATING GEAR WHEELS
Filed March 16, 1923   12 Sheets-Sheet 9

Inventor:
Howard D. Colman

Patented May 7, 1929.

1,712,254

UNITED STATES PATENT OFFICE.

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS.

MACHINE FOR GENERATING GEAR WHEELS.

Application filed March 16, 1923. Serial No. 625,469.

The object of this invention, generally stated, is to render possible the accurate generation of gear wheels, sprocket wheels and similar bodies of revolution at a relatively rapid rate.

In the accompanying drawings, Fig. 10 may also be briefly described as a vertical sectional view taken in the plane of line 10—10 of Fig. 3.

For the sake of brevity, the gear wheels, sprocket wheels or other articles to be ground will be hereinafter referred to as blanks.

A machine embodying my invention may comprise a grinding wheel having on its periphery a series of equidistant annular ribs, and means for rolling the blank across the periphery of the wheel. For the sake of accuracy in grinding and simplicity in dressing, the grinding wheel is so constructed that only flat surfaces are utilized for grinding the teeth of the blanks. To this end, the grinding wheel is given a frusto-conical form, one side of each of the ribs hereinbefore mentioned being normal to the axis of the grinding wheel. In Figs. 3, 4, 5 and 6, the active normal surfaces are indicated by the letter $a$. In a single passage of the blank across the periphery of the grinding wheel, only one side of each tooth is ground. In order that the opposite side of each tooth may be ground, the blank is positioned so as to present such opposite side of the teeth to the abrasive wheel, whereby the grinding of both sides of each tooth is effected in two passages of the blank across the abrasive wheel. It will be evident from Figs. 4 and 6 that during one passage of the blank the surfaces $a$ constitute one side of each tooth of an imaginary rack, and that during the other passage of the blank, said surfaces constitute the opposite side of said rack teeth.

The embodiment herein shown of the invention comprises two grinding wheels, one adapted to take a roughing cut and the other a finishing cut. These wheels have a common axis and are arranged with their large sides facing each other. Mechanism is provided for causing the blanks to travel past diametrically opposite portions of both of said wheels in succession. There are consequently four grinding stations designated A, B, C and D in Fig. 1. The place where the blanks are introduced into the machine and the finished work removed will be termed the loading station E. The roughing wheel is indicated at 1 and the finishing wheel at 2. These wheels are of relatively large diameter. The wheels 1 and 2 may be driven in any suitable way, as, for example, by means of belts (not shown) running over pulleys 3 fixed upon the shafts that carry the grinding wheels.

Figures 7, 8, 9, 10, 11, 12, 13, 14:
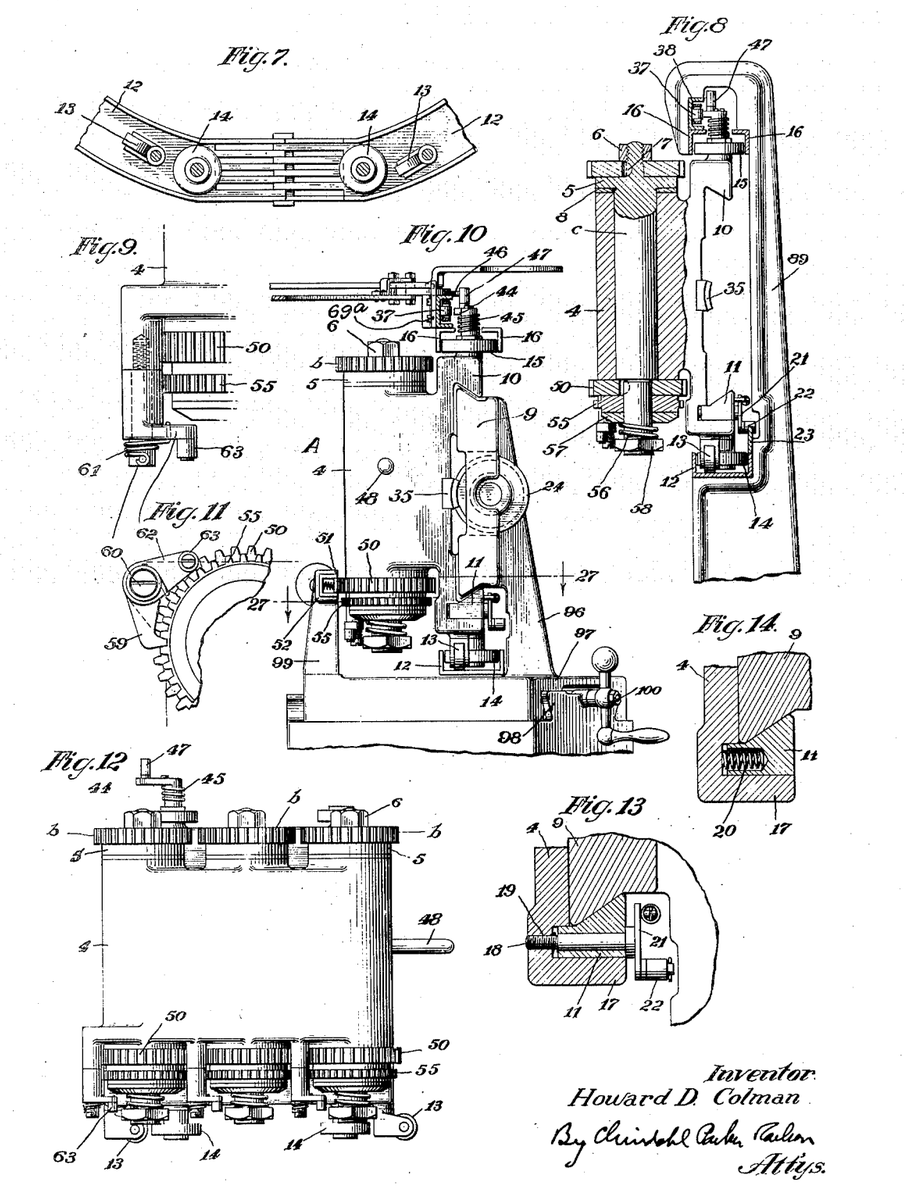
Fig. 7 is a view taken in the plane of line 7—7 of Fig. 17, showing one of the tracks or rails by means of which the cars are supported and guided.
Fig. 8 is a view showing how the cars are supported, guided and propelled intermediate the grinding stations.
Fig. 9 is a fragmental view illustrating a portion of the means for taking up play between the master rack and the master pinion.
Fig. 10 is a view showing how the cars are guided and propelled at each grinding station, also the means for causing the blank to roll past the grinding wheel.
Fig. 11 is a lower side view of the parts shown in Fig. 9.
Fig. 12 is a detail view of one of the cars.
Fig. 13 illustrates the movable gib with which each car is provided, the view being taken in the plane of line 13—13 of Fig. 24.
Fig. 14 shows means tending to move the gib out of engagement with the coacting guide, the view being taken in the plane of line 14—14 of Fig. 24.
Figures 15, 16:
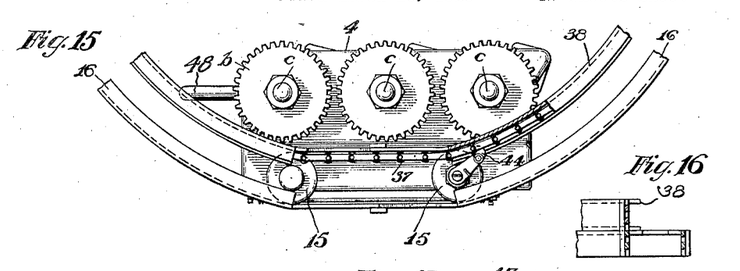
Fig. 15 is a top plan view of one of the cars, showing also a portion of the means for guiding and propelling the car between the grinding stations.
Fig. 16 is a fragmental sectional view taken in the plane of line 16—16 of Fig. 23, showing the guide for the upper portion of the carriage and the guide for the propelling chain.

The blanks are indicated at $b$. Each blank is rigidly secured to an arbor $c$ (Fig. 8) by means of which the blank is supported during the grinding operation and during its travel in the machine, and through which rolling movement is imparted to the blank while it is passing the grinding wheels. Each grinding wheel has the same number of grinding surfaces $a$ as there are teeth on the blank; consequently, it is possible to pass three blanks in close succession past the wheel. I therefore support the blanks on cars 4 (Figs. 8, 10 and 12), each adapted to support three arbors $c$. As best shown in Fig. 8, each arbor comprises a flange 5 against which the blank may be rigidly clamped by means of a nut 6 on the upper screw-threaded end of the arbor. 7 is a key for locating the blank in definite angular relation to the arbor. The flange 5 overlies the upper end of the bearing in which the arbor $c$ is rotatably supported. Preferably a washer 8 of suitable material is interposed between the flange 5 and said bearing.

While passing the abrasive wheels, the cars 4 are supported upon dove-tail guides 9 (Figs. 2, 10, 24 and 26). As shown in Fig. 10, the cars are provided with gibs 10 and 11 adapted to engage the dove-tail guides 9. Intermediate the guides 9, the cars are supported by means including rails 12 (Fig. 8) of channel form. Each car is provided at its lower side with two casters 13 (Figs 8 and 12) adapted to run in the rails 12, and thus carry the weight of the car. Each car also has two guide rollers 14 mounted on vertical pivots and adapted to lie between the vertical flanges of the channel rail 12. At the upper side of the car 4 are two guide rollers 15 mounted on vertical pivots and lying between the vertical flanges of two angular guide rails 16.

Figure 28:
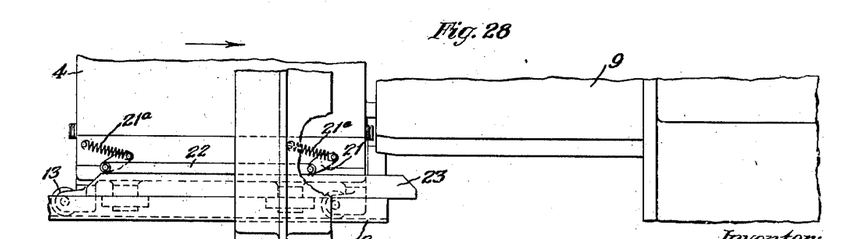
Fig. 28 is a fragmental elevation showing how the movable gib on the car is moved into position to avoid striking the end of the guide as the car enters a grinding station.

The lower gib 11 is movable with reference to the car 4 in order that it may be moved into such position that the car may pass onto the guide 9 freely and without danger of said gib striking the end of the guide. As shown in Fig. 13, the gib 11 lies upon a flange 17 on the car body, and is arranged to be moved laterally into engagement with the guide 9 by means of two screws 18 (Figs. 13 and 17) which extend freely through holes in the gib and enter screw-threaded openings 19 in the car. Coiled expansive springs 20 (Figs. 14 and 17) tend to move the gib away from the guide. The screws 18 are connected to turn synchronously by means of levers 21 each rigid with one of the screws, the lower arms of said levers being connected by means of a link 22. To the upper arms of the levers 21 are connected coiled contractile springs 21$^a$ which tend to turn the screws 18 in the direction to draw the gib 11 snugly against the guide 9. As the car approaches each guide 9, the gib 11 is released to movement by the springs 20 (Fig. 14) by means of a cam bar 23 (Figs. 8 and 28) located in position to be engaged by the leading end of the link 22 and thus turn the screws 18. After the car 4 has passed onto the guide 9, the link 22 rides off the cam bar 23, whereupon the springs 21$^a$ turn the screws 18 in the direction to draw up the gib 11 against the guide 9.

Figure 1:
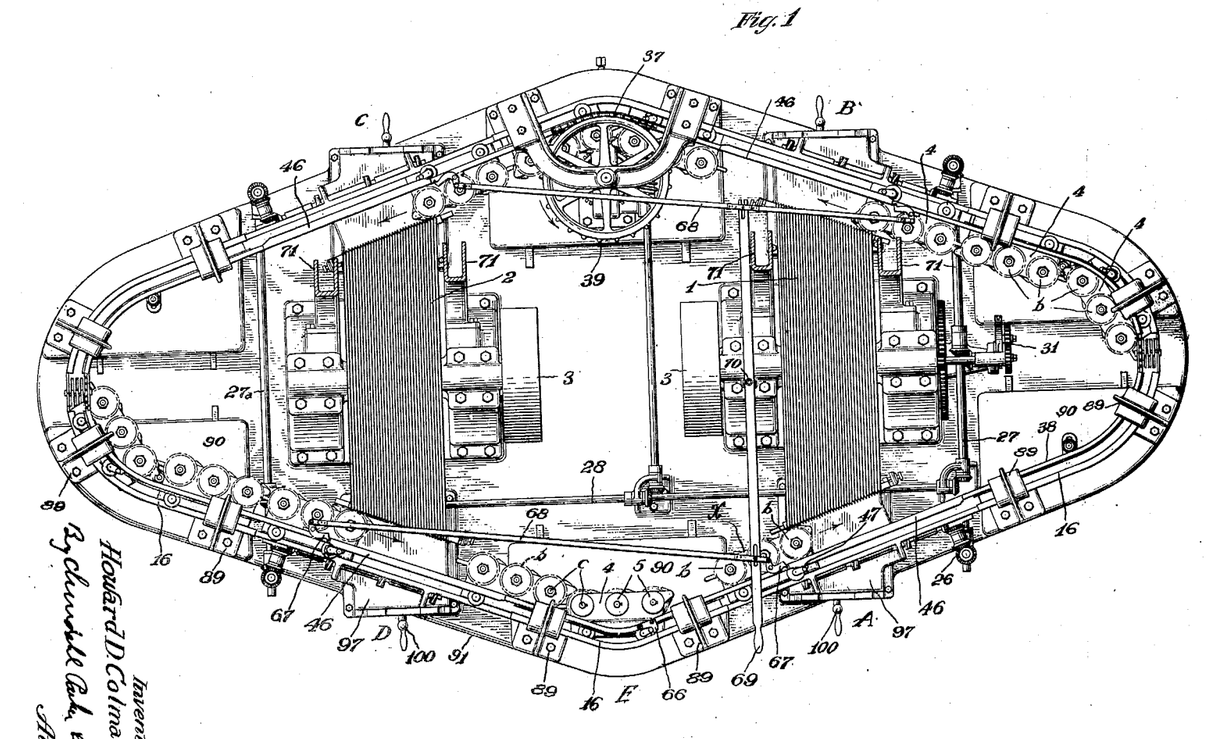
Figure 1 is a top plan view of a grinding machine embodying the features of my invention, the dressing mechanism being omitted.
Figure 2:
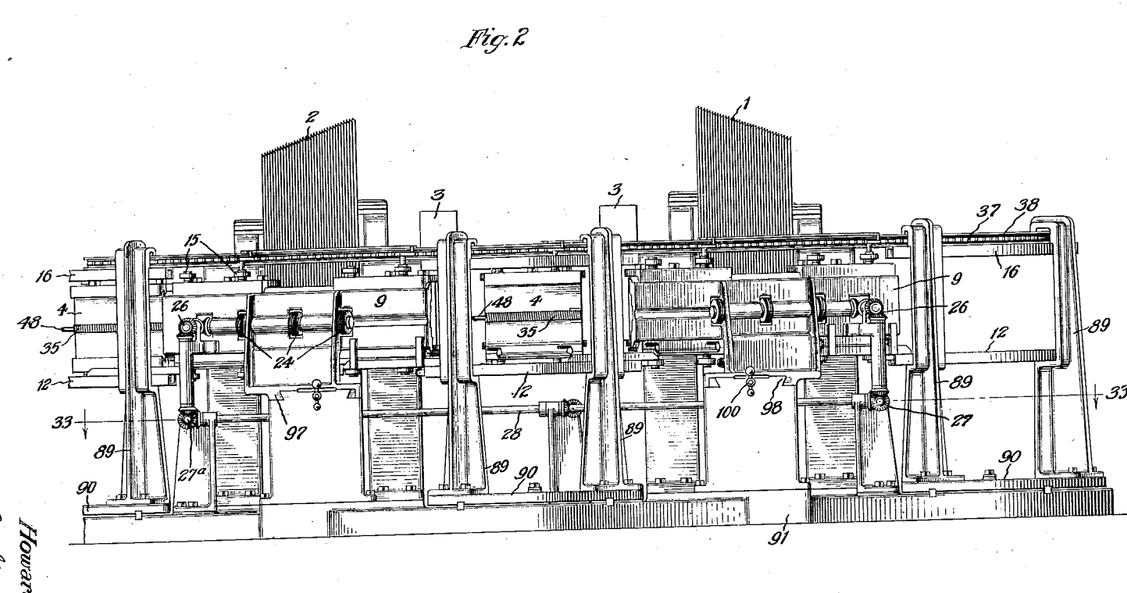
Fig. 2 is a fragmental side elevation of the machine.
Figures 3, 4:
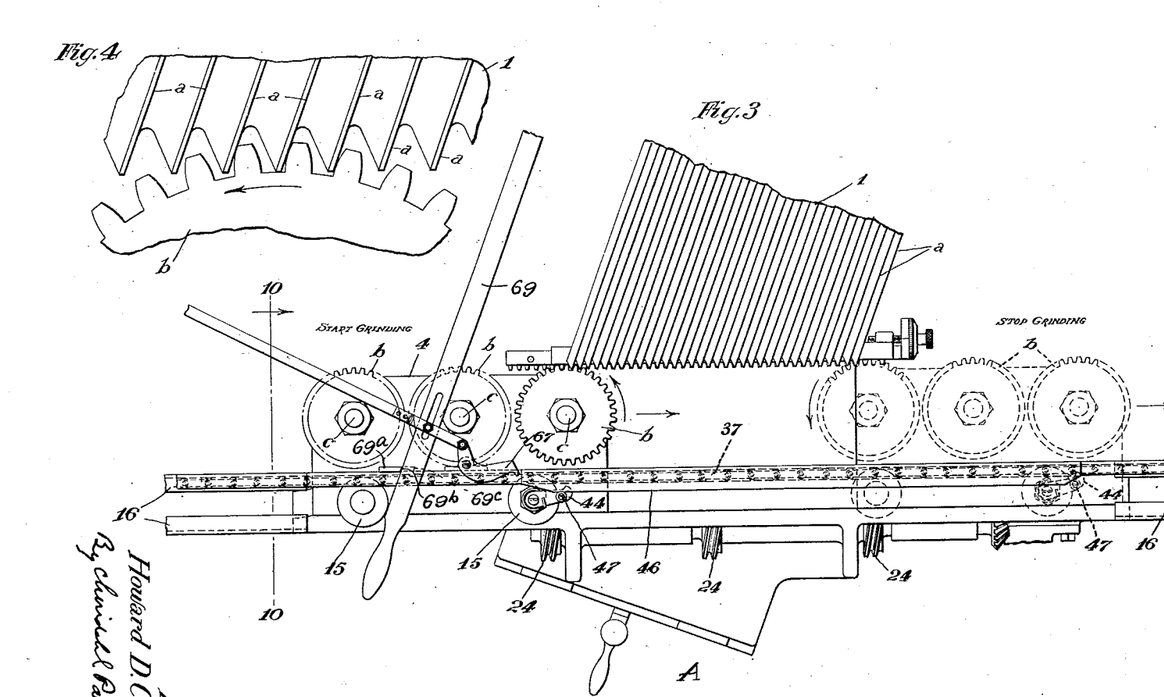
Fig. 3 is a fragmental view on an enlarged scale showing one of the grinding stations.
Fig. 4 is a fragmental view illustrating the operation of grinding one side of each tooth of a blank.
Figures 24, 25:
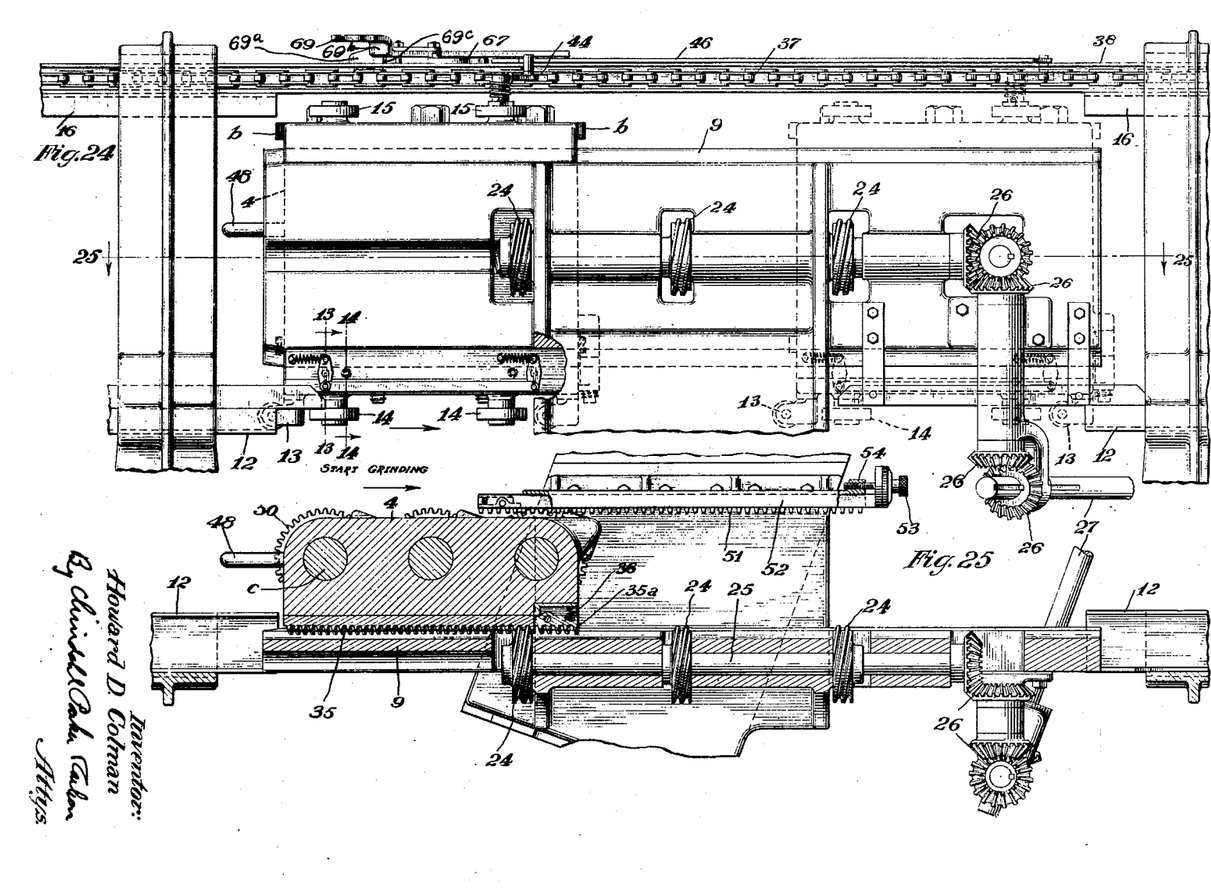
Fig. 24 is a fragmental side elevation of the grinding station shown in Fig. 3.
Fig. 25 is a horizontal sectional view taken in the plane of line 25—25 of Fig. 24.
Figure 26:
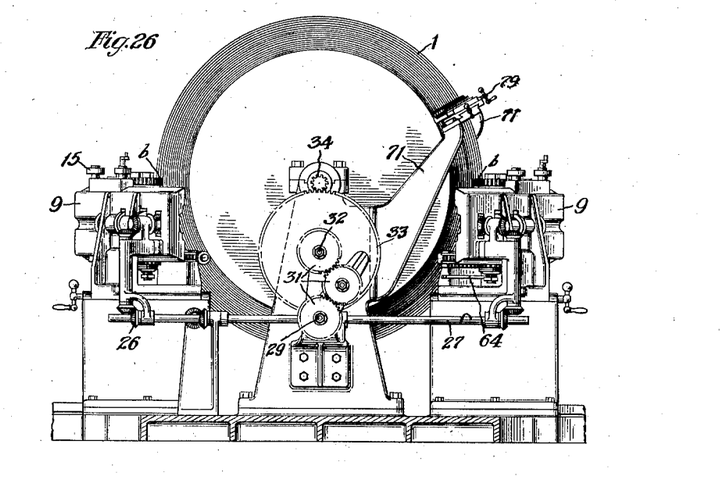
Fig. 26 is a fragmental end elevation of the machine taken from the right-hand end of Fig. 1.
Figure 27:
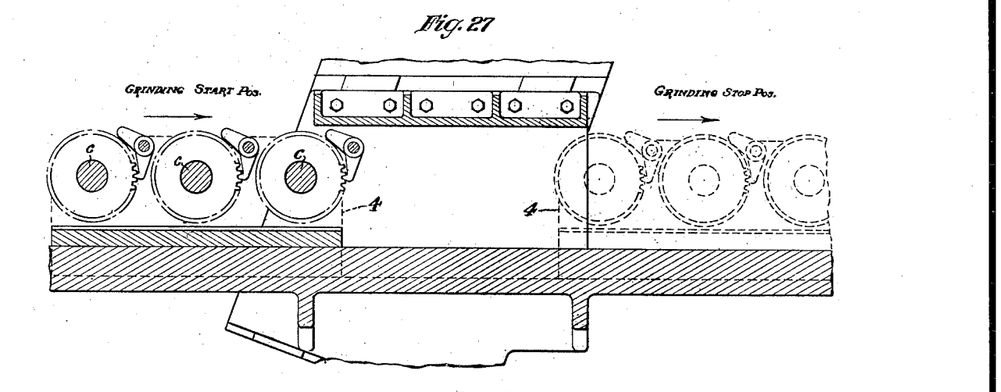
Fig. 27 is a view taken in the plane of line 27—27 of Fig. 10, showing how play between the master rack and the master pinion is prevented while one side of each tooth is being ground.

The means for moving the cars 4 while the blanks are being ground comprises a long segmental nut on each car and one or more spirally threaded elements, as, for example worms arranged at each grinding station in position to engage said nut. Referring to Fig. 24, which illustrates grinding station A, it will be noted that three worms 24 are provided, said worms being secured to a shaft 25 which is driven by means of a train of bevel gears 26 from a shaft 27 (Fig. 26). The worms at the opposite grinding station are driven from the same shaft 27. The worms at the grinding stations C and D are driven from a similar shaft 27$^a$ (Fig. 1). The shafts 27 and 27$^a$ are connected through a shaft 28. The shaft 27 is driven from a shaft 29 (Fig. 33) through bevel gears 30.

The shaft 29 is driven through change gears 31 (Fig. 26) from a shaft 32 carrying a spur gear 33 that meshes with a pinion 34 on the shaft of the grinding wheel 1.

To the outer side of each car 4 is secured a bar 35 (Figs. 10 and 17) having a segment of a nut formed upon its outer side for engagement by the worms 24. If desired, the leading end of said nut may be made yieldable, as indicated in Fig. 25, by providing a pivoted section 35$^a$ which is yieldingly held in alinement with the remainder of the nut by means of a spring 36.

Figure 33:
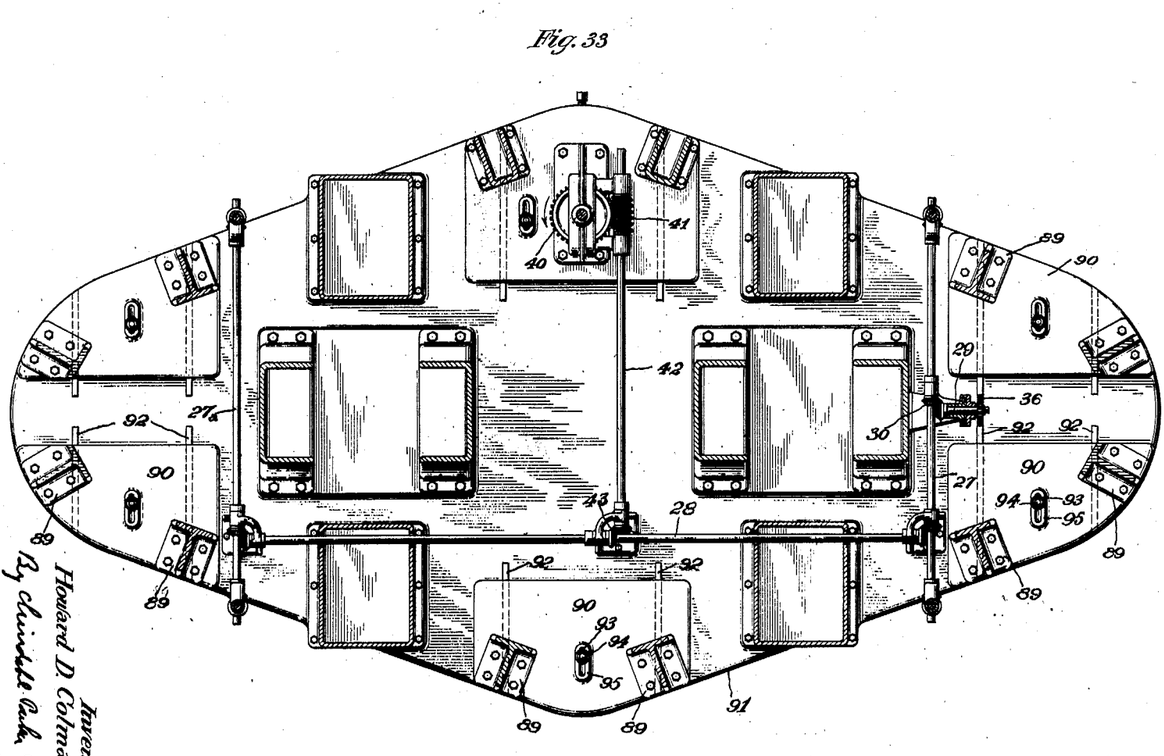
Fig. 33 is a sectional view taken in the plane of line 33—33 of Fig. 2.
Figures 34, 35, 36:
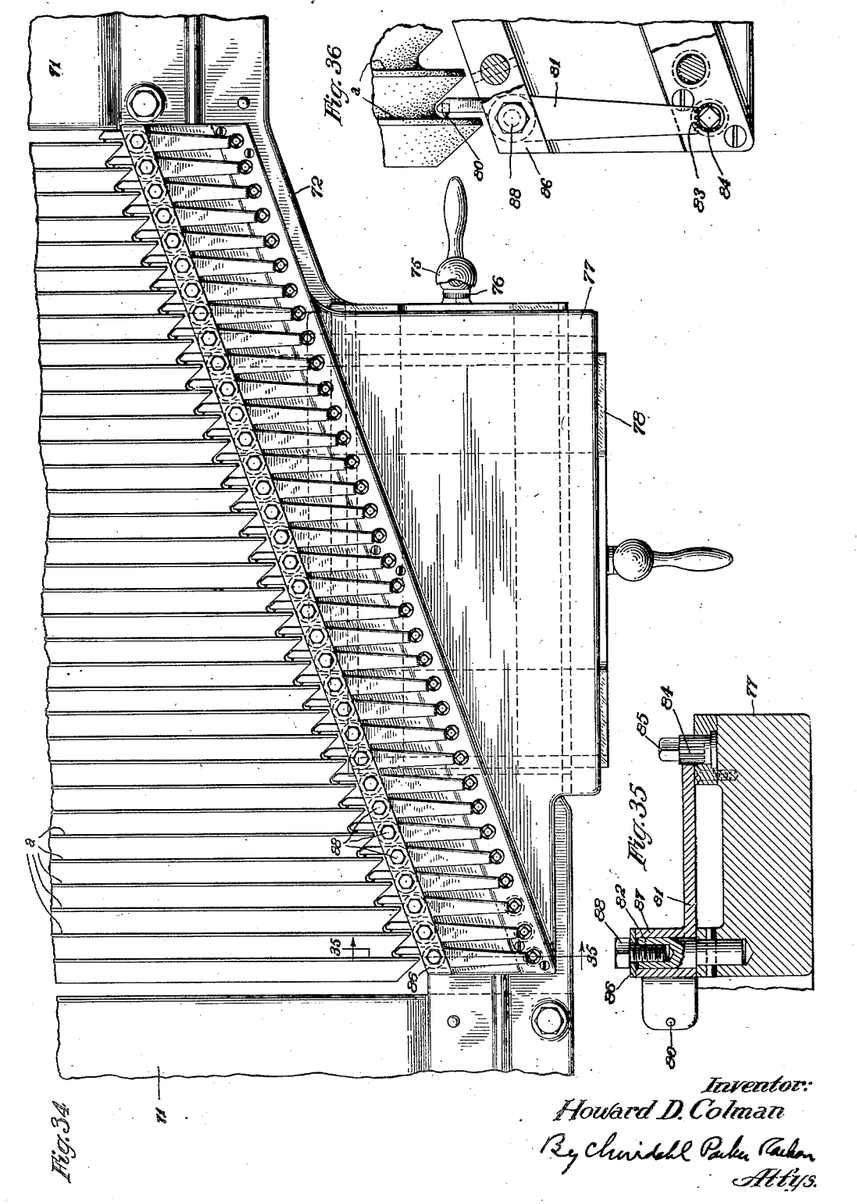
Fig. 34 is a plan view of the dressing mechanisms.
Fig. 35 is a view taken in the plane of line 35—35 of Fig. 34.
Fig. 36 is an enlarged view showing the operation of dressing the grinding wheel.
Figures 37, 38:
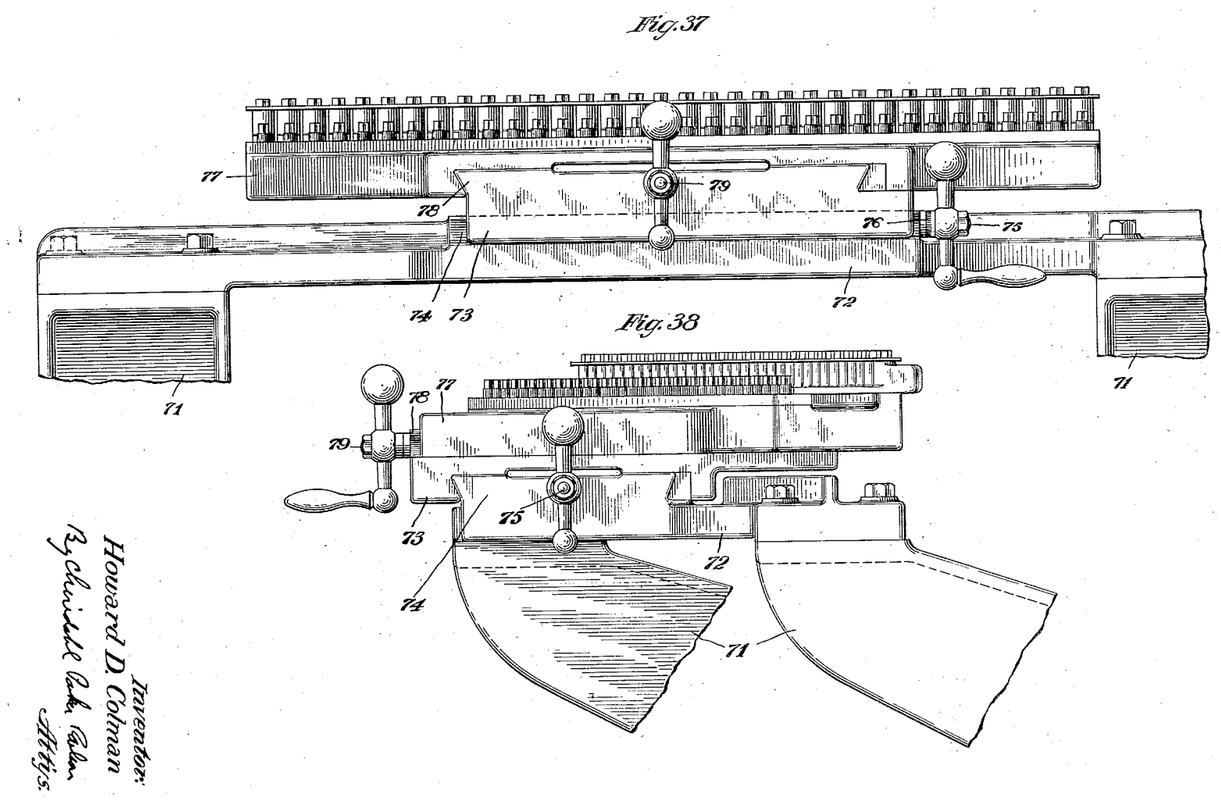
Fig. 37 is a front view of the parts shown in Fig. 34.
Fig. 38 is a view taken from the right-hand side of Figs. 34 and 37.

The means for causing the cars 4 to travel from one station to the next comprises an endless chain 37 (Figs. 8 and 17) mounted in what is virtually an endless guide 38. The chain 37 is driven by means of a sprocket wheel 39 (Fig. 1) to the shaft of which is fixed a worm wheel 40 (Fig. 33) that meshes with a worm 41 splined on a shaft 42. The shaft 42 is driven from the shaft 28 by means of bevel gears 43.

Figures 17, 18, 19:
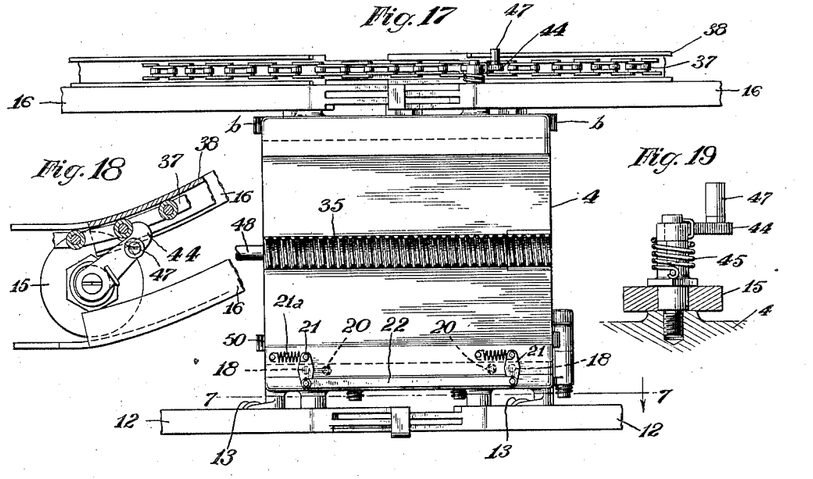
Fig. 17 is an outer side elevation of the parts shown in Fig. 15.
Fig. 18 is a fragmental view of the means for propelling the cars between grinding stations.
Fig. 19 is a view of the hook by means of which each car is yieldingly connected to the propelling chain.
Figure 20:
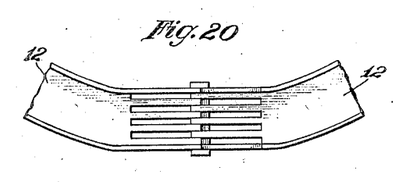
Fig. 20 is a fragmental plan view of the rail which carries the weight of the bars between grinding stations.
Figure 21:
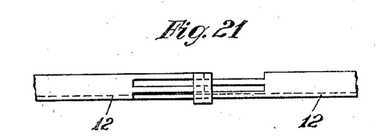
Fig. 21 is a side elevation of the parts shown in Fig. 20.
Figure 22:
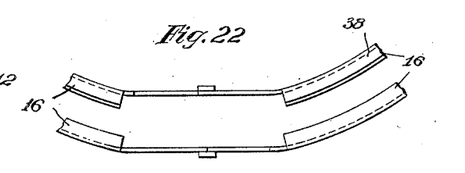
Fig. 22 is a plan view of the guide for the upper portion of the car and of the guide for the propelling chain.
Figure 23:
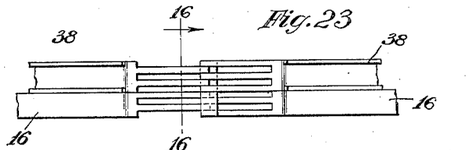
Fig. 23 is a side elevation of the parts shown in Fig. 22.

Each car is releasably connected to the chain 37 by means of a hook 44 (Figs. 18 and 19). Said hook is pivoted upon the axis of the leading guide roller 15 and is urged into position to be engaged by the rollers of the chain 37 by means of a torsion spring 45. Shortly after the car has reached the point at which it will be driven by one of the worms 24 the hook 44 is moved away from the chain 37 and held out of engagement therewith by means of a cam bar 46 (Fig. 3) secured to the guide 38 in position to engage a stud 47 on the hook 44. At the time when the car passes out of engagement with the last worm 24, the cam bar 46 allows the hook 44 to swing into position to be picked up by the chain 37, whereupon the car is moved to the next station.

Figures 30, 31:
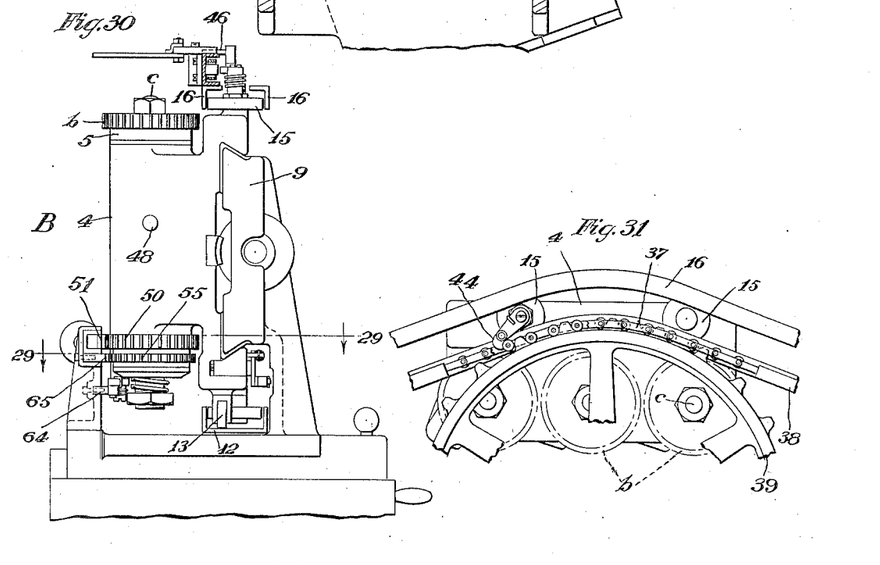
Fig. 30 is a view taken from the left-hand end of Fig. 29. It may also be described as a view taken in the plane of line 30—30 of Fig. 5.
Fig. 31 illustrates the drive for the propelling chain.
Figure 32:
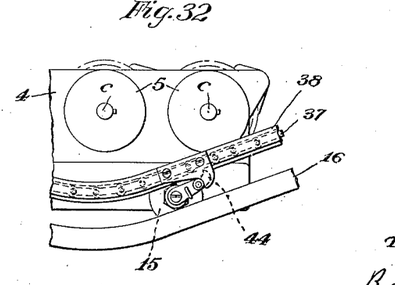
Fig. 32 shows a means for stopping the cars at the loading station.

Referring now to Fig. 31: It will be noted that the teeth of the sprocket wheel 39 do not engage every roller of the chain 37, but only every other roller. Consequently, if a tooth of said sprocket should force the hook 44 away from a given roller the hook will spring into engagement with the next succeeding roller.

The movement imparted to the cars 4 by the chain 37 is much faster than that produced by the worms 24, and enough cars are provided so that there shall always be a car waiting to enter a grinding station. The hook 44 is sufficiently shallow so that when a car strikes another car already stopped the chain 37 slips by the hook. On the rear end of each car is a spacing stud or buffer 48 (Fig. 12) which serves to hold the cars properly spaced apart when grouped at the various stations.

The means for rolling the blanks past the grinding wheels includes a master gear wheel fixed with relation to each blank and arranged to mesh with a master rack located at each grinding station. Upon reference to Figs. 8 and 10, it will be observed that a master gear wheel 50 is keyed upon the arbor $c$ in position to mesh with a master rack 51. The master rack 51 is mounted for longitudinal adjustment in a guide or support 52 (Figs. 10 and 25). To one end of the master rack is connected an adjusting thumb screw 53 which is threaded into the support for the rack at 54 (Fig. 25). By means of the thumb screw 53 the depth of the cut to be taken may be regulated. If desired, the end of the master rack 51 which is first engaged by the master pinions 50 may be made yieldable as indicated in Fig. 25.

As the car travels past the grinding wheel, the master pinion 50 meshing with the stationary master rack 51 will cause the blank to revolve or roll over the periphery of the grinding wheel, so as to present one side of each tooth of the blank to a grinding surface $a$.

Means is provided for taking up back-lash or play between the master pinion and the master rack. When one side of the tooth is being ground, back-lash is prevented by applying a brake to the master pinion so that the master pinion teeth shall be pressed against one side of the teeth of the master rack; and when the other side of the teeth of the blank is being ground, back-lash is prevented by frictionally driving the master pinion so as to hold the pinion teeth against the opposite side of the teeth of the master rack.

Figure 29:
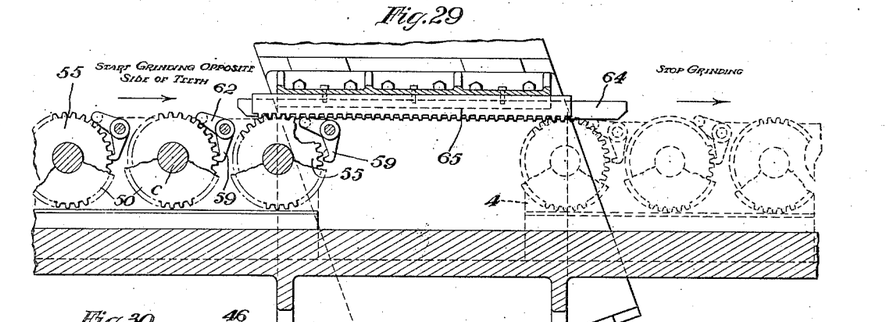
Fig. 29 is a view similar to that of Fig. 27, but showing how play between the master rack and the master pinion is prevented while the opposite side of each tooth is being ground, the view being taken in the plane of line 29—29 of Fig. 30.

Referring now to Figs. 8 and 10, it will be noted that a pinion 55 is rotatably mounted upon the arbor $c$ below the master pinion 50, the pinion 55 being yieldingly pressed against the lower side of the master pinion 50 by means of a coiled expansive spring 56 and a brake disk 57. The tension of the spring 56 may be adjusted by means of a nut 58 on the lower end of the arbor. A dog 59 (Fig. 11) mounted on the carriage 4 to swing on the axis 60 is adapted to engage the teeth of the pinion 55. A torsion spring 61 (Fig. 9) tends to swing the dog 59 into engagement with said pinion. 62 is an arm rigid with the dog 59 and carrying a roller 63 arranged to be engaged by two cam bars 64 located at grinding stations B and D, said cam bars serving to withdraw the dogs 59 from the pinions 55. These cam bars are shown in Figs. 26, 29 and 30. At said grinding stations there are provided two stationary racks 65 (Figs. 29 and 30) adapted to mesh with the pinions 55. As clearly shown in Fig. 8, the pinions 55 are slightly smaller in diameter than the master pinions 50.

While the blank is passing grinding station A, the dog 59 is in engagement with the pinion 55. By reason of the resulting resistance to rotation of the master pinion 50, the teeth of said master pinion are held against one side of the teeth of the master rack 51, thus preventing play between the master rack and the master pinion. While the blank is passing grinding station B, the dog 59 is held out of engagement with the pinion 55 by means of the cam bar 64, and the pinion 55 meshes with the stationary rack bar 65. Inasmuch as the master pinion 50 is of greater diameter than the pinion 55, the rack 65 tends to roll the master pinion 50 at a greater peripheral speed than that due to the master rack 51. Consequently, the teeth of the master pinion are held pressed against the opposite side of the teeth of the master rack from that engaged while passing station A. Similarly, while passing station C, the dog 59 holds the pinion 55 against rotation; and at station D the pinion is driven by the rack 65.

The grinding wheels 1 and 2 may be located at any desired distance from each other which will allow suitable space for the loading station E. Any preferred means may be employed to stop the cars at the loading station. Herein is shown a plate 66 (Fig. 1) attached to the guide 38, said plate having a cam surface adapted to be engaged by the stud 47 to disengage the hook 44 from the chain 37, said plate also having an angular stop portion lying in the path of said stud. When a car stops at the loading station, the operator replaces the ground gears with gears to be ground, and swings the hook 44 outwardly until the stud 47 is clear of the stop plate 66, whereupon a car which has previously come up to the car at the loading station pushes the last-mentioned car along until its hook 44 is picked up by the chain 37.

Any suitable means may be employed to keep the cars 4 from entering the grinding stations during the dressing operation. Herein is shown a hook 67 (Figs. 1 and 3) located at the entering side of each grinding station, said hook being pivotally mounted upon the guide rail 38 in position to engage and arrest the stud 47 (Figs. 8 and 12) of an approaching car. The hooks 67 may be connected for simultaneous actuation by any preferred means, as, for example, two links 68, and a hand lever 69, said hand lever being pivoted at 70 and having a pin-and-slot connection with said links for a reason to appear hereinafter. The double stepped stop plate 69ª (Figs. 3, 10 and 24) is a plate on the chain guide 38 against which the lever 69 is held in either of two positions. The upper stop 69ᵇ for the inoperative position of the hooks 67 is shown against the lever 69 in Fig. 3. The lower stop 69ᶜ serves to lock the hooks 67 in operative position. It will be seen that by swinging the hand lever 69 to the right, as viewed in Fig. 1, the hooks 67 will be swung into the path of the studs 47 of approaching cars, so that when said studs engage the hooks 67, the hooks 44 of said cars will be moved out of engagement with the endless chain 37. The engagement of the hooks 67 with the studs 47, serves to arrest the cars 4 and hold them against movement due to the pressure of following cars. The hooks 44 are sufficiently shallow so that the chain 37 may slip past the hooks 44 of the cars detained by the cars which are arrested by the hooks 67.

While various means may be employed to dress the plane grinding surfaces $a$, there has been selected for illustration the means shown in Figs. 34 to 38, inclusive. Two brackets 71 are secured in the main frame at opposite sides of each grinding wheel. To the upper ends of the brackets 71 is fixed a table 72 extending across the periphery of the grinding wheel. A cross slide 73 is mounted on a guide 74 on the table 72 for movement parallel with the axis of the grinding wheel. Any suitable means may be employed to move the cross slide 73 on the guide 74, as, for example, an ordinary adjusting screw 75, there being a graduated dial 76 connected with said screw for convenience in adjusting the cross slide to a known extent.

A slide 77 is mounted on a guide 78 on the cross slide 73 for movement perpendicularly to the axis of the grinding wheel and parallel to the plane grinding surfaces $a$, such movement being effected by means of an ordinary adjusting screw 79 or the like. The slide 77 carries, in this instance, a series of dressing points 80 (Figs. 35 and 36) corresponding in number to the grinding surfaces $a$. In the construction herein shown, each dressing point 80 is secured to one arm of a lever 81 which is pivoted upon a stud 82 rigidly mounted on the slide 77. The other arm of said lever is provided with a gear segment 83 that meshes with a gear segment 84 rotatably mounted on the bed 77. The segment 84 has a squared end 85 by means of which the segment may be turned to effect a nice adjustment of the dressing point 80. The dressing points may be secured in adjusted position by suitable means such as a clamping bar 86 overlying the hubs 87 of the levers 81, said bar being held pressed tightly against the ends of said hubs by means of screws 88.

After repeated dressing operations it will eventually become necessary to remove the grinding wheel, dress off the periphery of the wheel and form new plane grinding surfaces $a$. The wheel may then be replaced in the grinding machine. After each such operation, it is necessary to adjust the means for supporting and rolling the blanks to compensate for the decrease in diameter of the wheel. To this end the rails 12, 16 and 38 are mounted on brackets 89 (Figs. 1, 2, 8 and 33) which are secured to sub-bases 90, which are secured to the bed 91 of the machine for adjustment perpendicularly to the longitudinal center line of said bed. The means for guiding said sub-bases and for securing them in adjusted position may be of any suitable character. Herein are shown guide ribs 92 (Fig. 33) on the bed 91 and engaging guideways in the lower sides of the sub-bases 90. The sub-bases are locked in adjusted position by means of nuts 93 on the upper ends of studs 94 which project up from the bed 91 through elongated openings 95 in the sub-bases.

The guides 9 are carried by brackets 96 (Fig. 10) rising from slides 97 which are mounted on guides 98 for movement perpendicularly to the longitudinal center line of the bed 91. The racks 51 and 65 and the cam bars 64 (Fig. 29) are carried by brackets 99 (Fig. 10) on the slides 97. Any suitable means may be employed to adjust the slides 97 and hold them in adjusted position, as, for example, an ordinary adjusting screw 100.

In order that the two sides of the framework which constitutes the guide means for the cars 4 may be moved toward each other to compensate for decrease in the diameter of the grinding wheels due to wear and dressing, the rails 12, 16 and 38 at each end of the machine are made in two halves, and the ends of the sections of each rail are slotted as shown in Figs. 7, 17 and 20 to 23, inclusive, so as to provide virtually a tongue and groove connection allowing of adjustment toward and away from the longitudinal center line of the machine.

Adjustment of the length of the chain 24 to correspond with adjustment of the guides toward and away from the center line of the machine is effected by removing or adding one or more links.

The bevel gears on the shafts 27ᵃ and 27 (Fig. 24) are splined to permit the adjustment of the brackets 89. Likewise, the pin and slot connection in lever 69 to links 68 and the splined worm 41 on the shaft 42 permit the same adjustment.

The operation of the machine may be briefly described as follows:

In Fig. 1, the parts are shown in the position occupied shortly after the hand lever 69 has been operated to release the cars 4. If we follow the travel of the car marked $x$ in Fig. 1, we find that as it passes grinding station A, one side of each tooth of each of the three blanks on said car are ground, and that as the rearmost of the three blanks passes clear of the grinding wheel 1, the stud 47 of said car passes off the cam bar 46 (see the dotted position illustrated in Fig. 3), thus allowing the hook 44 to swing into engagement with the continuously moving chain 37. The chain 37 advances the car until said car overtakes one of the cars which is waiting in line to enter grinding station B. While the speed of the chain 37 is much faster than the rate of movement imparted to the cars by the worms 24, its speed is sufficiently slow so that a car advanced by the chain does not collide with objectionable force with a car which is being retarded by a car at a grinding station.

While the car $x$ was passing the grinding station A, the dogs 59 were in engagement with the pinions 55, thus acting to take up play between the master pinions 50 and the master rack 51. While the carriage $x$ is passing the grinding station B, the opposite side of each tooth of the blanks is being ground, and play betwen the master pinions and the master rack is taken up by driving the pinions 55 through the medium of the rack 65. As indicated in Fig. 29, the dog 59 is disengaged from the pinion 55 by the cam bar 64 just before the pinion 55 meshes with the rack 65.

Figures 5, 6:
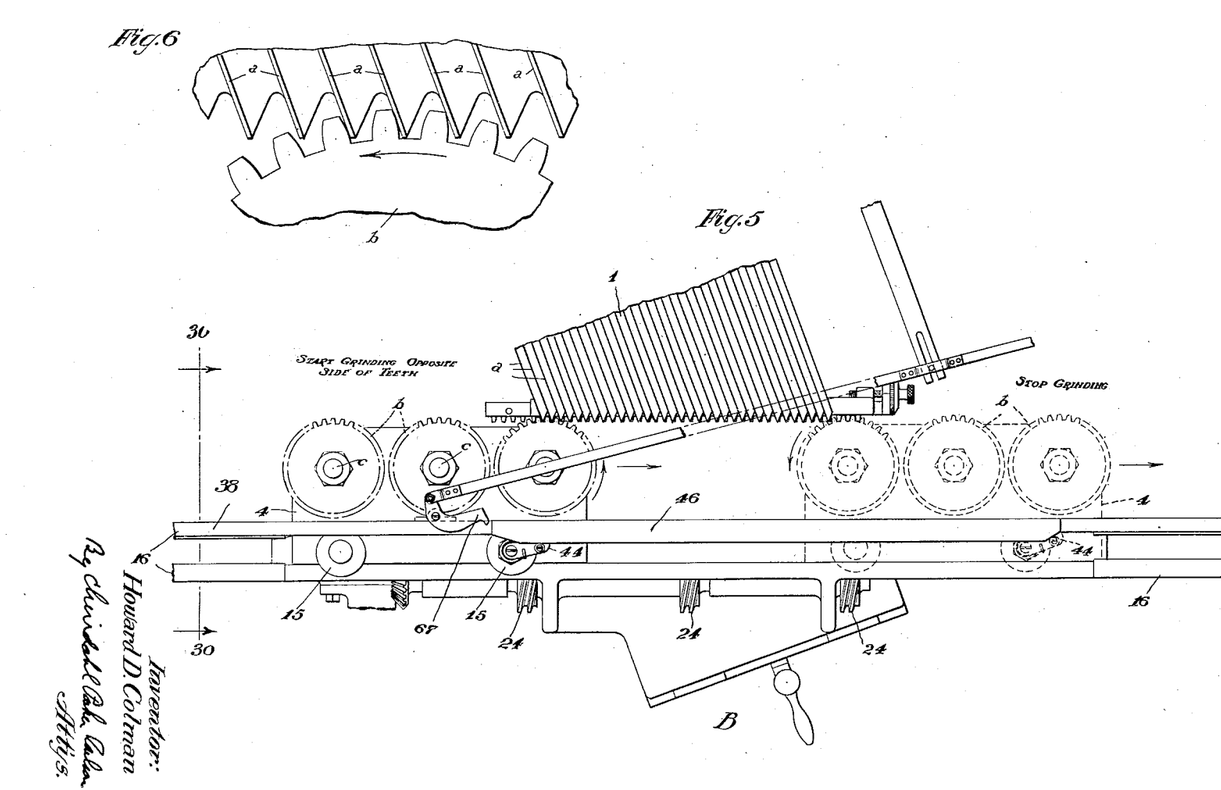
Fig. 5 is a view similar to that of Fig. 3 but showing the grinding station diametrically opposite the one illustrated in Fig. 3.
Fig. 6 is a fragmental view representing the operation of grinding the other side of the teeth of the blank.

As will be understood from Figs. 5, 24 and 25, the car 4 is engaged by one of the worms 24 before the hook 44 has been disengaged from the chain 37 by the cam bar 46. During the interval between the times when the worm 24 and the cam bar 46 become effective, the hook 44 yields to allow the chain 37 to pass.

When passing the stations C and D, the blanks are finish-ground and are thus ready to be removed from the arbor $c$ upon reaching the loading station E.

When dressing becomes necessary, the operator operates the lever 69 (Fig. 1) to place the hooks 67 in position to throw out and arrest the hooks 44 of the next approaching car at each grinding station. After the cars that were in the grinding stations have passed out, the operator adjusts the cross slide 73 (Fig. 38) to the necessary extent, and then advances and retracts the slide 77, thus causing the dressing points 80 to true up the grinding surfaces $a$. The master racks 51 (Fig. 25) are then adjusted by means of the screws 53 to an extent corresponding to the extent of adjustment of the cross slide 73. The stops 67 (Fig. 1) are then withdrawn, whereupon the cars begin to move into the grinding stations.

It should be distinctly understood that the machine herein shown is but one of various possible embodiments of my invention, that some or all of the advantages of the invention may be obtained by means of other relative arrangements of the grinding wheels, and that numerous changes in the construction and arrangement of the work-guiding and propelling means may be made without departing from the invention defined in the appended claims.

I claim as my invention:

1. The combination of a frusto-conical grinding wheel having upon its periphery a plurality of equidistant annular plane grinding surfaces, and means for rolling a toothed blank across the periphery of said wheel with the teeth of the blank in contact with said plane grinding surfaces.

2. The combination of a frusto-conical grinding wheel having upon its periphery a plurality of equidistant annular plane grinding surfaces, and means for rolling a toothed blank twice across the periphery of said wheel to present one side of each tooth to said plane surfaces in the first passage and the opposite side of said teeth in the second passage.

3. The combination of a frusto-conical grinding wheel having upon its periphery a plurality of equidistant annular plane grinding surfaces, and means for rolling a toothed blank across the periphery of said wheel at diametrically opposite points.

4. The combination of a grinding wheel, means for feeding blanks past one part of said wheel and for returning them past another part of said wheel, and means for rolling the blanks as they are fed past the wheel.

5. The combination of two frusto-conical grinding wheels each having upon its periphery a plurality of equidistant annular plane grinding surfaces, said wheels having a common axis and being positioned with their larger sides facing each other, means for causing toothed blanks to travel past diametrically opposite points of both of said wheels, and means for rolling the blanks as they pass the wheels.

6. The combination of two frusto-conical grinding wheels each having upon its periphery a plurality of equidistant annular plane grinding surfaces equal in number to the number of teeth on the blank to be ground, and means for rolling said blank across the peripheries of said wheels, whereby one side of each tooth is ground on one wheel and the other side of each tooth is ground on the other wheel.

7. Means forming a plurality of rotary equidistant annular plane grinding surfaces each perpendicular to its axis of rotation, and means for rolling a toothed blank along said surfaces to place each tooth in engagement with one of said plane grinding surfaces, the path of said blank being at an angle to the axis or axes of rotation of the grinding surfaces.

8. A gear-grinding machine having, in combination, a peripherally ribbed grinding wheel of relatively large diameter and wide peripheral face, and means for rolling a gear wheel across the periphery of said grinding wheel with the ribs in generating relation to the gear teeth.

9. A machine comprising, in combination, a metal-removing wheel having peripheral tooth-generating surfaces, the periphery of said wheel being of sufficient width to act upon a plurality of blanks simultaneously, a plurality of cars each having a plurality of blank-supporting arbors, means for circulating said cars to move them to and away from said wheel, and means for rolling the blanks over said tooth-generating surfaces.

10. A machine comprising, in combination, metal-removing means having tooth-generating surfaces and being of sufficient width to act upon a plurality of blanks simultaneously, a plurality of cars each having a plurality of blank-supporting arbors, means for circulating said cars to move them to and away from said metal-removing means, spirally threaded means arranged adjacent to said metal-removing means, each of said cars being arranged to be engaged by said spirally threaded means, the latter being arranged to move the cars past the metal removing means, said circulating means being arranged to deliver the cars to said spirally threaded means and receive them therefrom, a master rack arranged parallel with said spirally threaded means and adjacent to said metal-removing means, and a master pinion on each of said arbors arranged to mesh with said master rack to roll the blanks over said tooth-generating surfaces.

11. A machine comprising, in combination, metal-removing means having peripheral tooth-generating surfaces and being of sufficient width to act upon a plurality of blanks simultaneously, a plurality of cars each having a plurality of blank-supporting arbors, spirally threaded means arranged adjacent to said metal-removing means, each of said cars having a rack arranged to be engaged by said spirally threaded means, the latter being arranged to move the cars past the metal-removing means, means to deliver the cars to said spirally threaded means and receive them therefrom, a master rack arranged parallel with said spirally threaded means and adjacent to said metal-removing means, and a master pinion on each of said arbors arranged to mesh with said master rack to roll the blanks over said tooth-generating surfaces.

12. A machine comprising, in combination, a cutter having peripheral tooth-generating surfaces and of sufficient width to act upon a plurality of blanks simultaneously, a car having a plurality of blank-supporting arbors, spirally threaded means arranged adjacent to said cutter, said car having a rack arranged to be engaged by said spirally threaded means, the latter being arranged to move the car past the cutter, a master rack arranged parallel with said spirally threaded means and adjacent to said cutter, and a master pinion on each of said arbors arranged to mesh with said master rack to roll the blanks over said tooth-generating surfaces.

13. A machine having, in combination, a plurality of work-supporting cars, means for directing said cars to move in a circuit, said means including a guide, a gib on each car for holding the car in engagement with the guide, and means for moving said gib into proper position to clear the guide as the car is about to enter upon the guide.

14. A machine comprising, in combination, a grinding wheel having peripheral tooth-generating surfaces, the diameter of said wheel being many times greater than the thickness of the gear to be generated, and means for rolling a blank over said tooth-generating surfaces, the width of said wheel being sufficiently great so that it may act upon the entire peripheral face of the blank in one revolution of the blank.

In testimony whereof, I have hereunto affixed my signature.

HOWARD D. COLMAN.